(12) United States Patent
Ogawa

(10) Patent No.: US 6,453,059 B2
(45) Date of Patent: Sep. 17, 2002

(54) IMAGE TRANSFER SYSTEM

(75) Inventor: Eiji Ogawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/162,502

(22) Filed: Sep. 29, 1998

(30) Foreign Application Priority Data

Sep. 30, 1997 (JP) ............................. 9-265554

(51) Int. Cl.[7] ............. G06K 9/60; G06K 9/00; G06F 17/30
(52) U.S. Cl. ............ 382/132; 382/305; 382/132; 382/131; 707/6; 707/5; 707/2; 707/1
(58) Field of Search ............... 382/132, 158, 382/131, 169, 305, 276; 348/14.07, 14.09; 358/438, 448; 707/1, 2, 5, 6, 7

(56) References Cited

U.S. PATENT DOCUMENTS 5,034,987 A  * 7/1991 Fujimoto et al. ........... 382/132
5,272,625 A  * 12/1993 Nishihara et al. ...... 364/413.13
5,586,262 A  * 12/1996 Komatsu et al. ....... 395/200.02

* cited by examiner

Primary Examiner—Leo Boudreau
Assistant Examiner—Yosef Kassa
(74) Attorney, Agent, or Firm—Sughrue Mion, PLLC

(57) ABSTRACT

An image transfer system is provided with an image transfer controller which transfers image information input from image input systems to selected one of a plurality of image handling systems. Destination image handling systems for image information are entered in a memory in advance by the kinds of the image information. The kind of the image information is read out from information attached to the image information and input into the image transfer controller. When image information is input, the image transfer controller reads out destination image handling system corresponding to the kind of the image information from the memory and transfers the image information to the destination image handling system.

11 Claims, 1 Drawing Sheet

IMAGE TRANSFER SYSTEM

BACKGROUND OF THE INVENTION

1. Field of the Invention

This invention relates to an image transfer system, and more particularly to an image transfer system for transferring image information (e.g., various kinds of medical images such as X-ray images, RI images, ultrasonograms, CT images, MRI images and the like) to desired destinations such as medical image handling systems.

2. Description of the Related Art

There have been in wide use various medical image input systems such as an X-raying system, a RI, a CT (computed tomograph), an ultrasonograph and a MRI (magnetic resonance imager). Further there has been known a radiation image recording and reproducing system (CR: computed radiograph) in which radiation image information of an object such as a human body is once recorded on a stimulable phosphor sheet, the stimulable phosphor sheet is scanned by a stimulating light beam and an image signal is obtained by photoelectrically reading out light emitted from the stimulable phosphor sheet upon being exposed to the stimulating light beam. The stimulable phosphor sheet is a recording medium provided with a layer of stimulable phosphor which stores a part of the energy of radiation when exposed to radiation and emits light in proportion to the stored energy of radiation when subsequently exposed to stimulating light such as visible, infrared light or the like.

When transferring image information obtained by an image input system such as a CR, a CT, a MRI or the like to an image handling system such as a CRT display, a printer, an image storage system, an image processing system or the like, destinations for the image information is conventionally generally set at each image input system.

When a plurality of image input systems are on a network line, destination of image information must be set at each image input system. For example, even if the same destination is designated at different image input systems, the destination must be set at each image input system. Further even image information read out by the same image input system must be often transferred to different destinations according to the object part and/or the aim of imaging. Also in such a case, the destination must be set at each image input system.

When the destination of image information has been determined in advance according to, for instance, the kind of image depending on the image input modality, e.g., a CR image, a CT image or a MRI image; the aim of imaging, e.g., health examination, close examination or the like; and the object part, e.g., the chest, the breast or the like, it is very troublesome and inefficient to set the destinations at each image input system.

For example, in a general hospital, there is provided a system in which a plurality of kinds of image input systems such as a CR, a CT and a MRI respectively installed in a CR room, a CT room and a MRI room are connected to a plurality of kinds of image handling systems respectively installed different reading rooms (A to D) provided by department or doctor as shown in FIG. 2. In this system, assuming that the reading rooms A to D are respectively for a first internal department, a surgery department, a second internal department and a gynecology department, a CR image of the chest taken by the CR is transferred to the second internal department in the reading room C, and a CR image of the breast taken by the CR is transferred to the gynecology department in the reading room D. Further a MRI image taken by the MRI is transferred to the surgery department in the reading room B and a CT image taken by the CT is transferred to the first internal department in the reading room A. In such a case, it is very troublesome to set where the image is to be transferred each time an image is taken.

SUMMARY OF THE INVENTION

In view of the foregoing observations and description, the primary object of the present invention is to provide an image transfer system which can eliminate trouble that the destination of images must be set at each image input system in the case where the destinations of images have been determined according to the kinds of the images such as image input modality, the aim of imaging, the object part and the like.

In accordance with the present invention, there is provided an image transfer system comprising an image transfer control means which transfers image information input thereinto from image input systems to selected one or more of a plurality of image handling systems, an entry means in which destination image handling systems for image information are entered in advance by the kinds of the image information, and an image kind input means which inputs into the image transfer control means the kind of the image information input thereinto, wherein the image transfer control means, when image information is input, reads out from the entry means destination image handling system(s) corresponding to the kind of the image information input from the image kind input means and transfers the image information to the destination image handling system(s).

It is preferred that the image information be provided with attached information representing the kind of the image information and the image kind input means automatically inputs the kind of the image information into the image transfer control means on the basis of the attached information.

The kind of image information depends on the kind of the image input means such as a CR, a CT or a MRI; the aim of imaging such as health examination, close examination or the like; and/or the object part such as the head, the chest, the breast or the like.

In accordance with the present invention, in the case where the destinations of images have been determined according to the kinds of the images such as image input modality, the aim of imaging, the object part and the like, the image information input into the image transfer control means can be transferred to the destination(s) corresponding to the kind of the information by inputting the kind of the image information without trouble that the destination of images must be set at each image input system. Especially when the image information is provided with attached information representing the kind of the image information, the image information can be automatically transferred to the destination(s) corresponding to the kind of the information without operation of the operator.

Further since the destinations of the image information can be set by the entry means in the image transfer system, setting and/or change of the destinations can be controlled only by operating the image transfer system, which enables centralized control of the destinations of the image information and eliminates necessity of setting the destination at each of a plurality of image input systems.

DESCRIPTION OF THE PREFERRED EMBODIMENT

Figure 1:
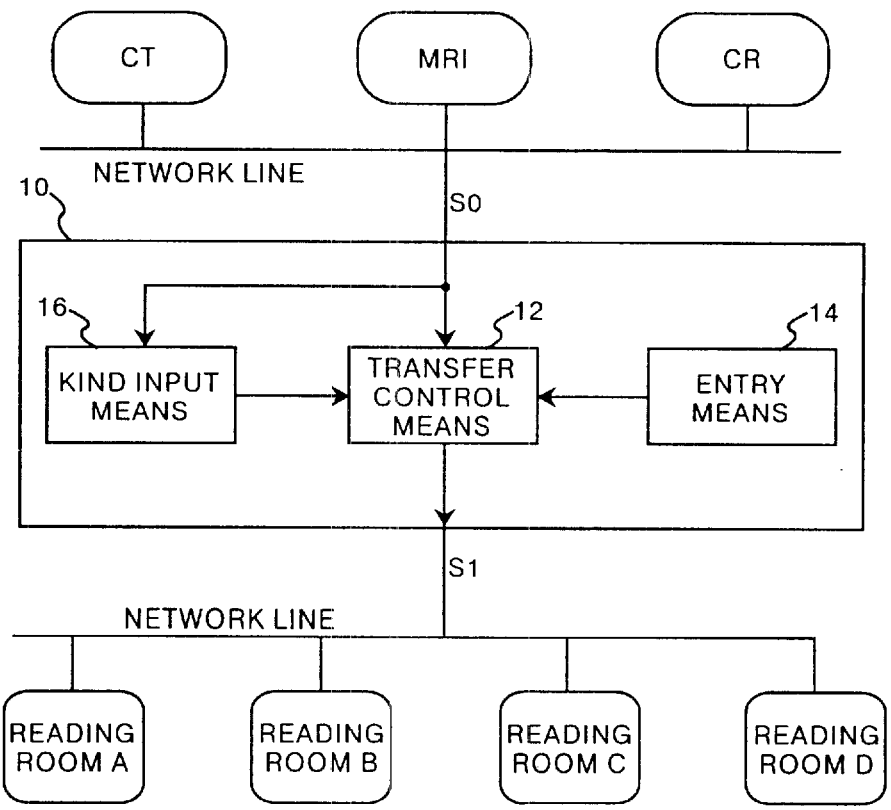
FIG. 1 is a view showing an image transfer system of the present invention as applied to a network line of image input systems and image handling systems.
Figure 2:
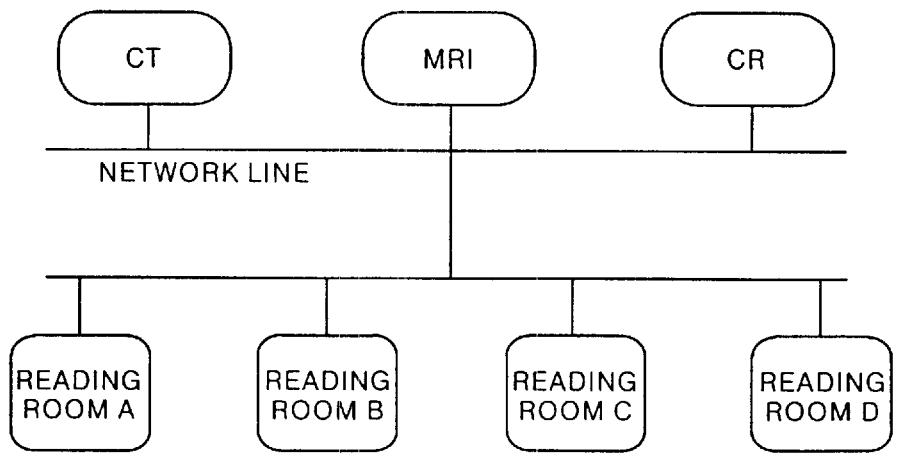
FIG. 2 is a view showing a conventional system of image input systems and image handling systems connected by a network line.

In FIG. 1, an image transfer system 10 in accordance with an embodiment of the present invention is for transferring an image signal (image information) So input from a CT, a MRI or CR by way of a network line to selected one or more of image handling systems (not shown) such as a CRT display, a printer (e.g., a laser printer), an image storage system, an image processing system or the like installed in image reading rooms A to D. The image transfer system 10 comprises an image transfer control means 12 which controls the destination image handling system for the image signal S0, an entry means 14 in which destination image handling systems for a plurality of kinds of image signals are entered in advance by the kinds of the image signals, and an image kind input means 16 which inputs into the image transfer control means 12 the kind of the image signal input thereinto.

The image kind input means 16 reads out attached information on the kind of the image signal from an image signal S0 when the image signal S0 is input and inputs the kind of the image signal into the image transfer control means 12.

The image transfer control means 12 reads out from the entry means 14 a destination image handling system corresponding to the kind of the image signal input from the image kind input means 16 and outputs the image signal S0 to the destination image handling system. Each of the image signals S0 output from the CR, CT and MRI is provided with attached information representing the kind of the image represented by the image signal.

The operation of the image transfer system of this embodiment will be described, hereinbelow.

The destination image handling systems for respective kinds of image signals are entered in the entry means 14 in advance. In this embodiment, it is assumed that a CR image of the chest taken by the CR is transferred to the second internal department in the reading room C, a CR image of the breast taken by the CR is transferred to the gynecology department in the reading room D, a MRI image taken by the MRI is transferred to the surgery department in the reading room B and a CT image taken by the CT is transferred to the first internal department in the reading room A.

When an image signal S0 is input into the image transfer system 10 from one of the CR, CT and MRI, the image kind input means 16 first reads out the kind of the image signal S0 on the basis of the attached information on the kind of the image signal and inputs the kind of the image signal S0 into the image transfer control means 12. The image kind input means 16 may read out the kind of the image signal in any known manner.

The image signal S0 is input also into the image transfer control means 12, and the image transfer control means 12 reads out from the entry means 14 the destination image handling system corresponding to the kind of the image signal S0 and transfers the image signal S0 to the destination image handling system. For example, when the attached information represents that the image signal S0 is of a CR image of the chest, the image kind input means 16 inputs a signal representing that the kind of the image signal is a CR image of the chest into the image transfer control means 12. Then the image transfer control means 12 reads out from the entry means that the destination image handling system is the image handling system in the reading room C for the second internal department and transfers the image signal S0 to the image handling system in the reading room C.

Similarly when the attached information represents that the image signal S0 is of a CR image of the breast, the image transfer control means 12 transfers the image signal S0 to the image handling system in the reading room D for the gynecology department, when the attached information represents that the image signal S0 is of a MRI image, the image transfer control means 12 transfers the image signal S0 to the image handling system in the reading room B for the surgery department, and when the attached information represents that the image signal S0 is of a CT image, the image transfer control means 12 transfers the image signal S0 to the image handling system in the reading room A for the first internal department.

Thus in this embodiment, the image information input into the image transfer system can be automatically transferred to the destination corresponding to the kind of the information represented by the attached information. Accordingly the operator of each image input system can be relieved from trouble of setting the destination of images each time an image is taken. Further the destination of the image can be changed only by changing the destination stored in the entry means 14.

Though, in the embodiment described above, the image kind input means 16 detects the kind of the image signal from the attached information, the image kind input means 16 need not be limited to this form. For example, the kind of the image is judged through an image reproduced on, for instance, a CRT display and the kind of the image may be input through a keyboard or the like.

What is claimed is:

1. An image transfer system comprising:

an image transfer control means which transfers image information input thereinto from at least one image input system to at least one of a plurality of destination image handling systems selected based on a kind of image information to be processed, an entry means in which destination image handling systems for image information are entered in advance, based on the kind of the image information to be processed, and an image kind input means which inputs into the image transfer control means type information indicating the kind of the image information input to the image transfer control means, wherein the image transfer control means, when the image information is received, reads from the entry means which of the plurality of destination image handling systems corresponding to the type information received from the image kind input means should receive the image information and automatically transfers the image information to a corresponding one of said at least one of the plurality of destination image handling systems, wherein the kind of image information designates at least one of a machine source of an image, a diagnostic purpose of the image, and a body part which is the subject matter of the image.

2. The image transfer system as defined in claim 1 in which the image information includes the type information representing the kind of image information and the image kind input means automatically inputs the type information into the image transfer control means.

3. The image transfer system as defined in claim 2 operable in a network, wherein the image transfer control means determines said corresponding one of said at least one of the plurality of destination image handling systems to receive the image information prior to sending data to the network.

4. The image transfer system as defined in claim 3, wherein the kind of image information designates at least one of the machine source of the image, the diagnostic purpose of the image, and the body part which is the subject matter of the image, and the destination image handling system is selected based on at least one of the machine source, the diagnostic purpose, and the body part subject matter.

5. The image transfer system as defined in claim 4, wherein the destination image handling system is selected based on the machine source, the diagnostic purpose, and the subject matter.

6. The image transfer system as defined in claim 1, wherein the kind of image information designates at least one of the machine source of the image, the diagnostic purpose of the image, and the body part which is the subject matter of the image, and the destination image handling system is selected based on at least one of the machine source, the diagnostic purpose, and the body part subject matter.

7. The image transfer system as defined in claim 1, wherein the image transfer control means receives the image information directly from said at least one image input system and automatically transfers the image information directly to the corresponding one of said at least one of the plurality of destination image handling systems.

8. The image transfer system as defined in claim 7, wherein the destination image handling systems comprise at least one of a cathode-ray tube (CRT) display, a printer, an image storage system, and an image processing system.

9. The image transfer system as defined in claim 8, wherein the image transfer control means receives the image information directly from said at least one image input system and automatically transfers the image information directly to the CRT display.

10. The image transfer system as defined in claim 8, wherein the image transfer control means receives the image information directly from said at least one image input system and automatically transfers the image information directly to the printer.

11. The image transfer system as defined in claim 8, wherein the image transfer control means receives the image information directly from said at least one image input system and automatically transfers the image information directly to the image processing system.

\* \* \* \* \*